(12) United States Patent
Nguyen

(10) Patent No.: US 11,484,988 B2
(45) Date of Patent: Nov. 1, 2022

(54) DRY WET BLAST MEDIA BLASTING SYSTEM

(71) Applicant: Axxiom Manufacturing, Inc., Fresno, TX (US)

(72) Inventor: Phuong Taylor Nguyen, Richmond, TX (US)

(73) Assignee: Axxiom Manufacturing, Inc., Fresno, TX (US)

( * ) Notice: Subject to any disclaimer, the term of this patent is extended or adjusted under 35 U.S.C. 154(b) by 196 days.

(21) Appl. No.: 15/417,546

(22) Filed: Jan. 27, 2017

(65) Prior Publication Data

US 2021/0379730 A1    Dec. 9, 2021

(51) Int. Cl.
*B24C 5/04* (2006.01)

(52) U.S. Cl.
CPC .................... *B24C 5/04* (2013.01)

(58) Field of Classification Search
CPC .......... B24C 5/02; B24C 5/04; B24C 7/0007; B24C 7/0015; B24C 7/0023; B24C 7/0084
See application file for complete search history.

(56) References Cited

U.S. PATENT DOCUMENTS

| | | | |
|---|---|---|---|
| 4,728,205 A | | 3/1988 | Hasumi et al. |
| 4,768,709 A | * | 9/1988 | Yie ........................... B05B 7/12 175/67 |
| 4,821,467 A | * | 4/1989 | Woodson .............. B24C 7/0084 451/99 |
| 5,018,670 A | * | 5/1991 | Chalmers .................. B24C 5/04 239/433 |
| 5,054,249 A | * | 10/1991 | Rankin .................. B24C 7/0053 451/99 |
| 5,201,150 A | * | 4/1993 | Kuboyama ........... B24C 7/0038 451/100 |
| 6,168,503 B1 | * | 1/2001 | Pao ........................... B24C 5/04 451/38 |

(Continued)

FOREIGN PATENT DOCUMENTS

| | | |
|---|---|---|
| DE | 102004023246 | 10/2005 |
| WO | 2018055012 | 3/2018 |

*Primary Examiner* — Joel D Crandall
(74) *Attorney, Agent, or Firm* — Kearney, McWilliams and Davis, PLLC; John M. DeBoer

(57) ABSTRACT

A wet media blasting system with a water injection system that provides more uniform distribution of the water, air and media components for achieving better application of the mixture while minimizing the amount of water required to contain and minimize or eliminate airborne particulate matter such as dust produced during the blasting operation. By more thoroughly mixing the water into the abrasive/water mix, the amount of water required is reduced. The abrasive feed is placed and shaped to optimize spray coverage and minimize abrasive flow into injection space thus mitigating water nozzle clogs. The abrasive flow is shaped as it is released from the metering valve in order to tighten the abrasive flow before it enters into the blast air stream. The shaped and tightened abrasive flow is maintained at the lower portion of the blast air stream. This positions the abrasive flow in optimum placement for spray wetting the abrasive as it flows into and through the nozzle. This also mitigates nozzle clogging by directing most of the abrasive flow away from the water spray nozzle port.

19 Claims, 7 Drawing Sheets

(56) References Cited

U.S. PATENT DOCUMENTS

| | | | |
|---|---|---|---|
| 8,353,741 B2* | 1/2013 | Fowler, III | B24C 7/0084 |
| | | | 451/38 |
| 9,138,863 B2* | 9/2015 | Schubert | B24C 7/0038 |
| 2002/0083981 A1* | 7/2002 | Thompson | B24C 7/0046 |
| | | | 137/544 |
| 2009/0130959 A1* | 5/2009 | Mase | B24C 7/00 |
| | | | 451/38 |
| 2016/0236323 A1* | 8/2016 | Mase | B24C 1/08 |

* cited by examiner

DRY WET BLAST MEDIA BLASTING SYSTEM

BACKGROUND OF THE INVENTION

Field of the Invention

The invention is related to media blasting systems and is specifically directed to wet media blasters.

Discussion of the Prior Art

Traditional media blasting systems use dry blast media which stored in a bulk tank or pot with an outlet for introducing the media into a media control or metering valve. The metering valve is also connected to a source of pressurized air whereby blast media is mixed into the air stream. The blast media and air stream mix is propelled through a nozzle and directed to a work surface. Systems of this design are well known and widely available. One such source of traditional dry media blasting systems is Axxiom Manufacturing, Inc. of Fresno, Tex., which offers the Schmidt brand blasting equipment.

Dry media blasting systems have proven to be very effective in media blast operations and have been in operation for over 100 years. However, such systems do release the blast media or dust into the surrounding area during operation. This is not an issue in some applications but there are many circumstances where dust containment or suppression is desirable or required.

Wet media blasters have been created to minimize the generation of airborne dust particles in blasting operations. In a broad sense, such systems are basically units that combine water and abrasive and release the combination into a stream of pressurize air through a nozzle, whereby the solution can be blasted at a work surface under high pressure. When water is mixed in with the abrasive, the dust in contained in water droplets and does not become airborne but is collected at the base of the surface being blasted. In industrial applications, there are two types of wet media blasting systems.

In the first, water is mixed in with the media in the media storage tank. The mixture of media and water is then released, i.e., injected, into a pressurized air flow and directed to a release nozzle. In the second, the abrasive and air are mixed upstream of a water injection system located at the inlet port of the release nozzle. Water is injected into the abrasive/air mix just as the abrasive/air mix enters the release nozzle. Both systems are effective in reducing the presence of airborne dust during operation. However, there is a need for a system which more evenly mixes the abrasive/air/water mixture to improve blasting results and reduce the amount of water required to achieve the correct mix.

SUMMARY OF THE INVENTION

The subject invention is directed to a wet media blasting system with a unique water injection system that provides more uniform distribution of the water, air and media components for achieving better application of the mixture while minimizing the amount of water required to contain and minimize or eliminate airborne particulate matter such as dust produced during the blasting operation. Also, by more thoroughly mixing the water into the abrasive/water mix, the amount of water required is reduced.

In accordance with the subject invention, the abrasive feed is placed and shaped to optimize spray coverage and minimize abrasive flow into injection space thus mitigating water nozzle clogs. The abrasive flow is shaped as it is released from the metering valve in order to tighten the abrasive flow before it enters into the blast air stream. The shaped and tightened abrasive flow is maintained at the lower portion of the blast air stream. This positions the abrasive flow in optimum placement for spray wetting the abrasive as it flows into and through the water injection conduit. This also mitigates nozzle clogging by directing most of the abrasive flow away from the water spray nozzle port.

Water injection shape, radial orientation, and longitudinal angle of water injection optimize wetting of the abrasive, lowers pressure drop, and mitigates clogging. The water spray is placed downstream of but in close proximity to the abrasive-air mixing point. This permits easier wetting of abrasive before full velocity is achieved. The water spray nozzle is placed inside a port or conduit that intersects the water injection conduit at an oblique angle rather directly perpendicular to the abrasive flow. The water spray angle follows general direction of blast air flow for efficiency. The angle spray port is smaller in diameter than the blast air conduit in order to use the flow to keep the abrasive from contacting the spray nozzle. The blast air flow keeps the grit and dust away from the nozzle, minimizing or even eliminating the tendency to clog the spray nozzle. The spray nozzle is placed sufficiently within the spray port to further decrease the likelihood of abrasive contact with the water spray nozzle. The radial orientation of the water spray nozzle relative to the abrasive feed orientation allows optimum effectiveness for wetting the abrasive.

Two additional unique features of the invention are the development of a new water injection delivery system and a control system that permit better control of the air/water mix during operation. In the subject invention, the water pressure can be regulated, as well as the air pressure. This assures that the differential pressure between air pressure and water pressure can be accurately monitored and controlled. One advantage of this system is the ability to perform four separate operations using the same delivery and mix system and the same release nozzle. The customary wet blast operation can be performed using the air/media/water mixed controlled to the desired combination and pressure. Where desired, the media flow may be cut off, permitting a media free water rinse. In addition, the water may also be cut off, permitting the use of the pressurized air flow to function as a dryer. The system may also be used in the standard dry blast mode by shutting off the water shower.

The water injection system is unique and novel in that instead of providing uniform media flow past the injector, the media flow is partially deflected away from the water outlet, permitting the water to flow into and more fully saturate the water injection conduit. This promotes more uniform mixing of the media and water and has the added advantage of creating a space between the water injector nozzle and the dry media, reducing the tendency to clog the nozzle, particularly at low pressure operation when the media can back flow toward the water injector nozzle. Specifically, a media release orifice plate is provided at the junction between the metering valve and the main air flow line for directing the media flow away from the water injector nozzle. This keeps the nozzle from being clogged and provides more clear space in the injector unit for better distribution of the water.

The water injection conduit feature prevents gravity backflow to abrasive feed port. The taper internal diameter or the step up internal diameter are placed upstream of the water injection point and downstream of the abrasive feed port. Specifically, the ID of the abrasive release conduit where the abrasive is fed is smaller than the ID of the water injection conduit where the water is injected. The enlarged ID is then maintained downstream through the blast hose. This prevents residual water from flowing upstream to where the abrasive is introduced into the blast air stream which would eventually wet and stop the abrasive flow altogether. A differential pressure gage is positioned between water pressure and blast air pressure to indicate, quantify, and control water flow. The ability to have consistent, adjustable, and repeatable water flow control with a simple operation is a significant advantage over prior art systems. In the exemplary embodiment, the differential pressure indicator is positioned to measure the difference between the water pressure and blast air pressure. Since water injection cannot be achieved unless the water pressure is greater than the blast air pressure. Typically, the spray nozzle is a fixed orifice, water flow rate is proportional to how much the water pressure is greater than the blast air pressure. This differential pressure gage reading provides the operator with a visual indication of water volume flow rate. In addition, a water pressure regulator is provided for permitting the operator to adjust the water pressure. The pressure differential indicator and the water pressure regulator, in combination, provide the operator with the means to consistently and repeatedly control the water flow rate. Manually variable water flow is important because each operator will adjust the water flow according to the abrasive type, abrasive size, abrasive flow rate, dust content, and blast pressure.

An additional feature of the invention is the inclusion of a washdown circuit. After wet blasting, the surface is usually left with residual abrasive. This requires a rinse to wash the abrasive off the surface. The water flow rate for washdown is significantly higher than the water flow rate during blasting which is usually for dust control.

Another additional feature may be a blowoff using compressed air to blow dry and ready the blasted surface for painting. This feature basically allows two setting of air pressure. One is for blasting which is generally greater than 80 psig. The washdown and blowoff would be at a much lower air pressure approximately 35 psig. This is achieved by allowing the operator to quickly select either pressure setting. If the water pressure regulator setting the same, significantly lowering the regulated air pressure will concurrently increase the water flow rate; thereby quickly creating a washdown mode. If the water flow is shutoff, this creates a lower pressure blowoff mode also. The washdown/blowoff circuit consists of two pilot air regulators and a slave regulator. A high-pressure blast pilot regulator and a washdown/blowoff pilot regulator are each ported to the much large and higher flow slave regulator. A three-way valve is placed between the two pilot regulators and slave regulator to allow the operator to manually select which pilot regulator controls the slave regulator.

DETAILED DESCRIPTION OF THE ILLUSTRATED EMBODIMENT

Figure 1:
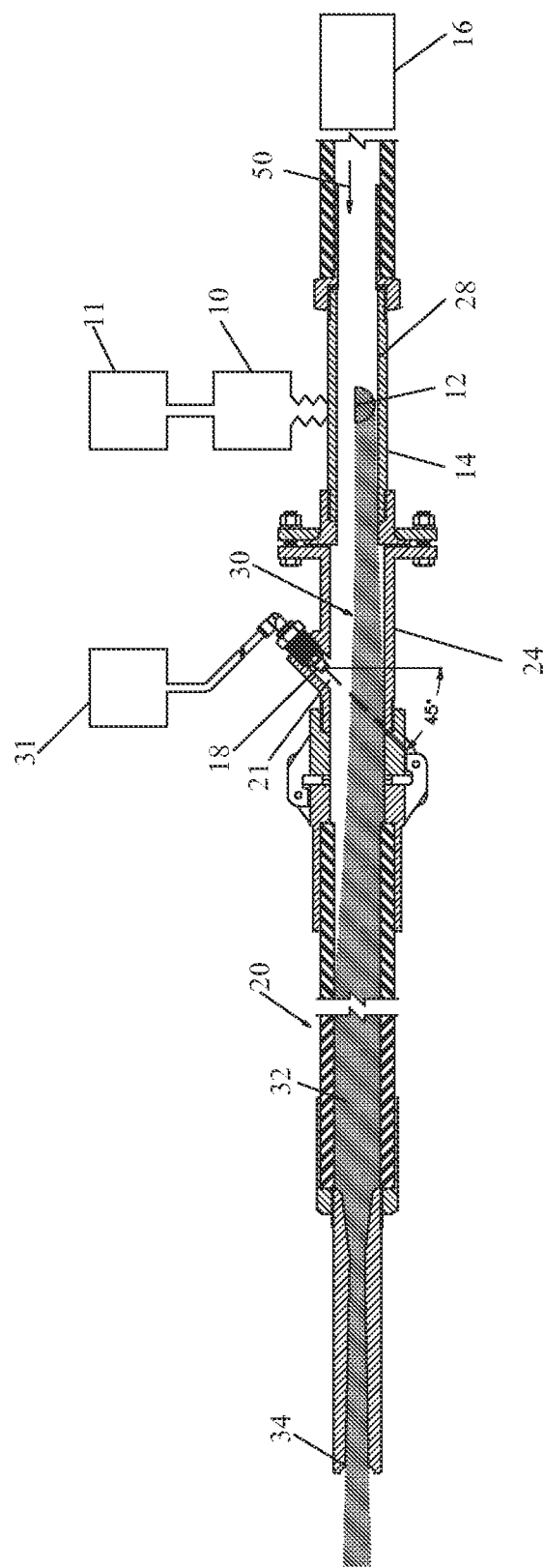
FIG. 1 is a longitudinal sectional view of the air supply line, media control gate mounted on a typical media control valve, the water injector, and the release nozzle.

Referring first to FIG. 1, the delivery system for the media/air/water mix assembly includes a typical abrasive metering valve 10, a tank or pot 11 for storing the abrasive, a media release orifice 12 in media release conduit 14, a source of pressurized air 16 connected to the media release conduit 14 and a water source 31 in communication with a typical media nozzle 34. In the exemplary embodiment, the media release conduit 14, water injection conduit 24 and the media nozzle 34 are separate units coupled together on a common center line. This specific configuration is a matter of choice well within the purview of those skilled in the art. The essential novel elements are the location of the abrasive release orifice 12 downstream of the air source 16 and the location of the water injection nozzle 18.

An important feature of the invention is the media release orifice 12, which is substantially upstream of the water spray. In addition, the media release orifice 12 is configured and shaped to direct released media along the bottom surface 28 of the flow conduit(s) 14, 24 and 20. The half circle configuration has been shown to work well in practice, but other shapes and configurations could be utilized based on application and operator choice. This abrasive release system directs the abrasive stream to the bottom wall 28 of the flow conduit(s) and provide a relatively clear air flow above the abrasive as shown at 30. As flow continues the abrasive expands to fill the conduit(s) as depicted at 32, upstream of the blast nozzle 34.

Figure 2:
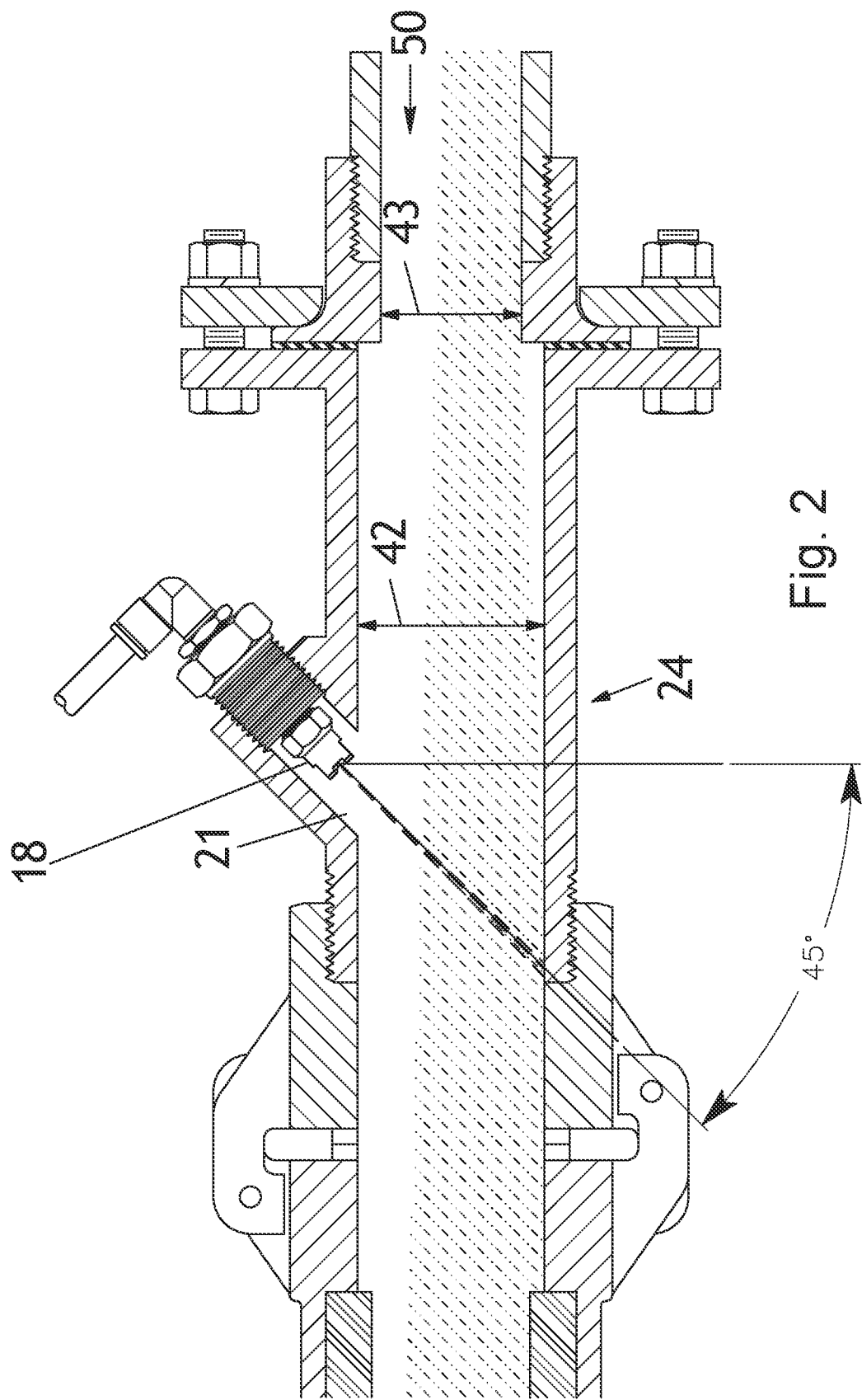
FIG. 2 is an enlarged, partial sectional view looking in the same direction as FIG. 1, with a stepped-up diameter flow chamber in the release nozzle.
Figure 3:
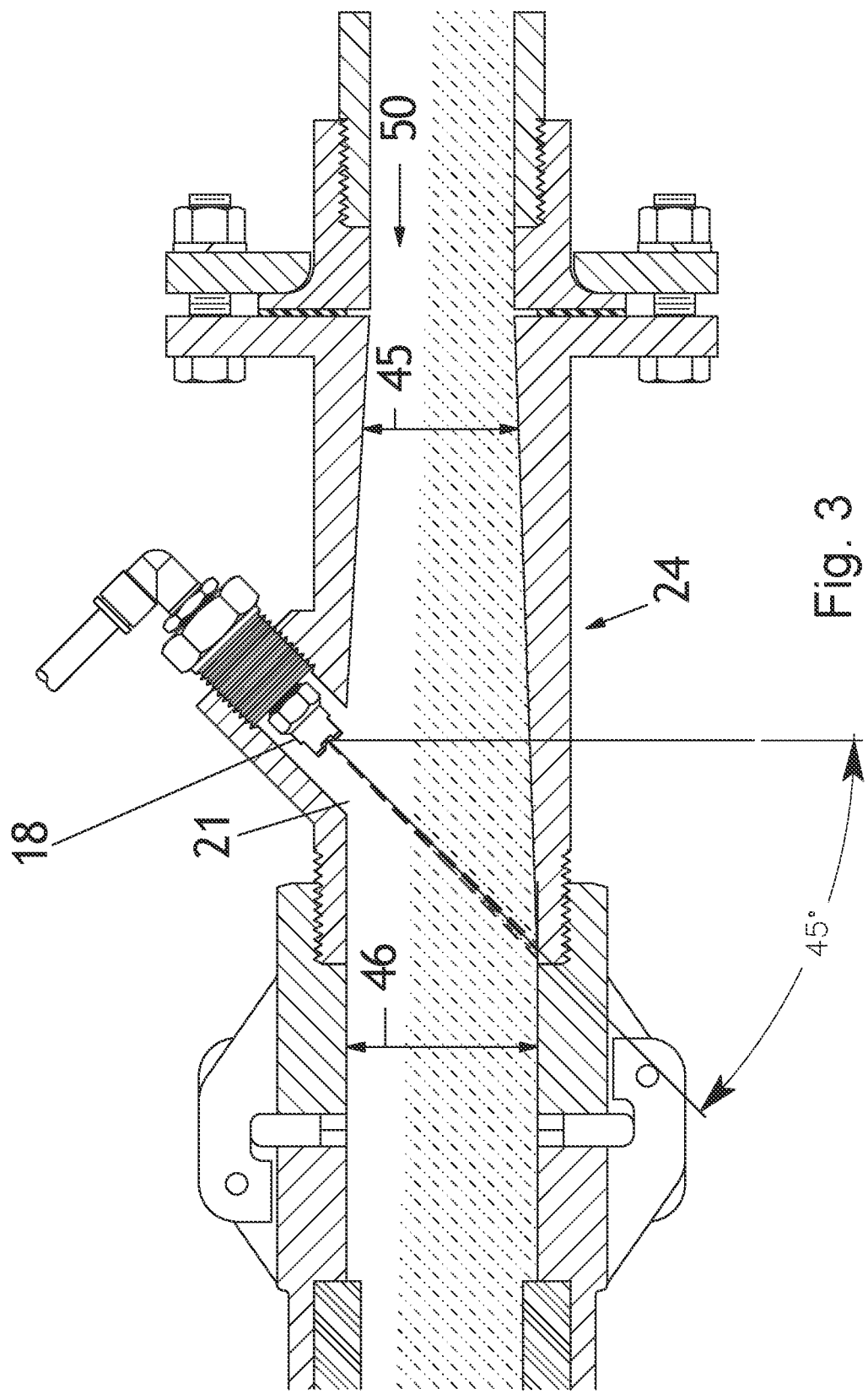
FIG. 3 is similar to FIG. 2 with a tapered transition expanding diameter flow chamber in the release nozzle.

An enlarged, partial view of the conduit system is shown in FIG. 2 and in FIG. 3. The only distinction between these views is that the water injection conduit 24 of FIG. 2 is of constant diameter 42, whereas the water injection conduit 24 of FIG. 3 is of increasing diameter, as shown as 45 and 46. The difference in these two configurations is for the purpose of showing two ways of preventing gravity backflow. FIG. 2 uses as step up, immediate transition between ID 42 and 43. FIG. 3 shows a tapered transition between the two IDs 46 and 45.

Figure 4:
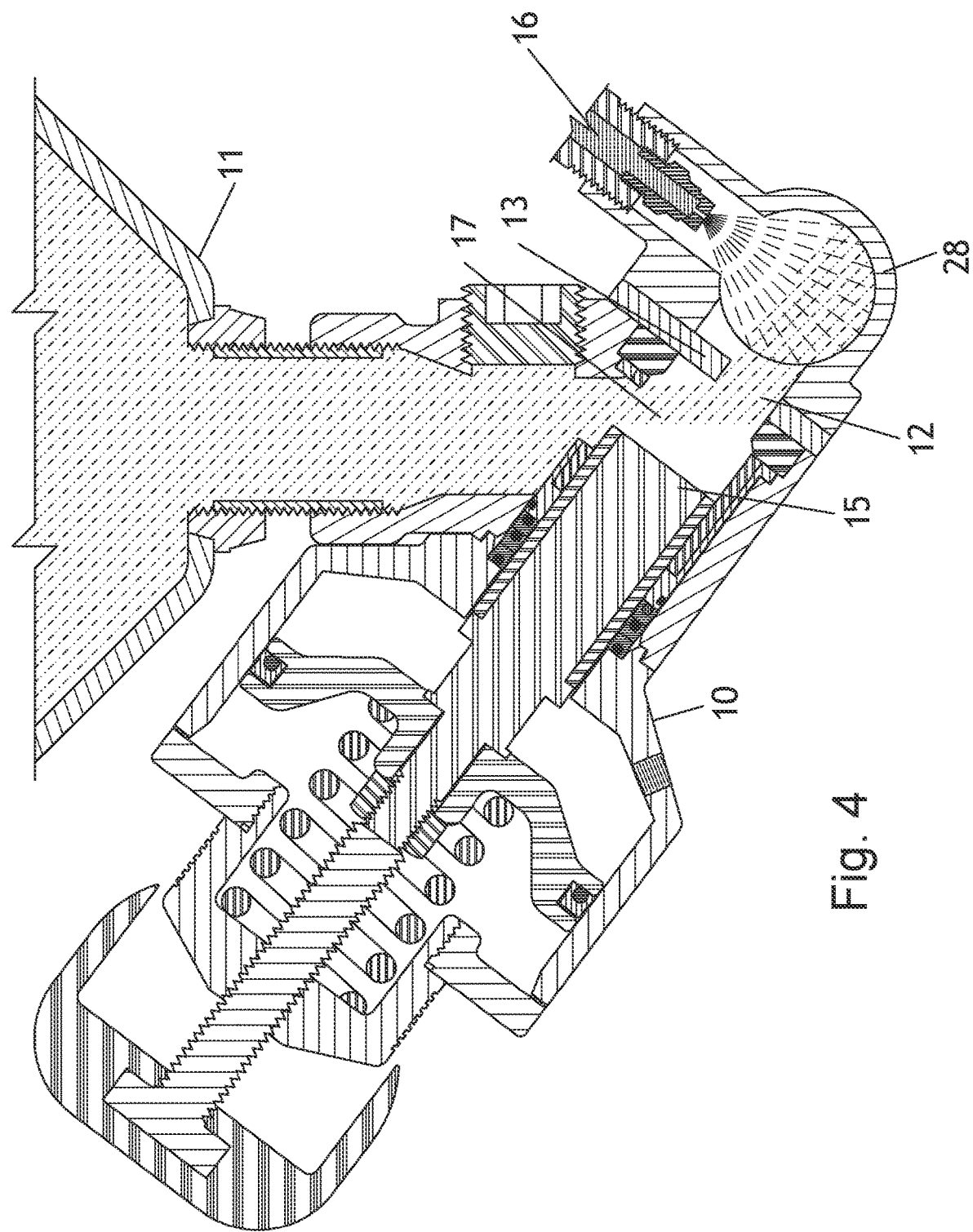
FIG. 4 is a longitudinal sectional view showing a typical metering valve, the abrasive control gate, the abrasive storage tank and the water injector. Air flow is perpendicular to the drawing surface.

FIG. 4 is a sectional view looking in the direction of arrow 50 in FIGS. 2 and 3. The media stored in the tank 11 is released through the outlet opening 17 of the media metering valve 10, in well-known manner. The position of the plunger 15 in the media metering valve 10 controls the size of the outlet opening 17. The media then flows through the media release orifice 12 created by presence of media release orifice plate 13. The media release orifice plate 13 is secured to the outlet end of the media metering valve. The media release orifice 12 is shaped such that the media flow is directed downward toward the bottom of the flow conduits, leaving an air gap along the top of the conduits, as previously stated, and as clearly shown at 30 in FIG. 1.

Specifically, the media release orifice 12 is shaped and positioned to optimize water spray coverage and minimize abrasive flow into the injection space thus mitigating water nozzle clogs. This controls the shape and location of the abrasive flow as it is released from the media metering valve in order to tighten the abrasive flow before it enters into the blast air stream. The shaped and tightened abrasive flow is maintained at the lower portion of the blast air stream. This positions the abrasive flow in optimum placement for spray wetting the abrasive as it flows into and through the conduit section housing the water release nozzle 18. This also mitigates nozzle clogging by directing most of the abrasive flow stream away from the water spray nozzle port 21, more clearly shown in FIGS. 2 and 3.

As best shown in FIG. 4, the water injection system is unique and novel in that instead of providing uniform media flow past the water injector, the media flow is partially deflected away from the water outlet, permitting the water to flow into and more fully saturate the flow conduit. This promotes more uniform mixing of the media and water and has the added advantage of creating a space between the water injector nozzle 18 and the dry media, reducing the tendency to clog the injection nozzle, particularly at low pressure operation when the media can back flow toward the water injector nozzle. The media release orifice plate 13 is provided below the media metering valve 10 and above the bottom surface of flow conduits 28 for directing the media stream away from the water injector nozzle. This keeps the nozzle from being clogged and provides more clear space in the injector unit for better distribution of the water.

The water spray chamber 21 is positioned out of the main flow stream, see FIGS. 2 and 3. The water spray port or chamber is placed such to keep it out of the main flow stream and angled to use the air flow inertia to keep abrasive and dust away from the injection or spray nozzle. This feature prevents gravity backflow to media release conduit. The taper internal diameter and the step down internal diameter are both placed upstream of the water injection point and downstream of the media release conduit. Specifically, the ID of the media release conduit where the abrasive is fed is smaller than the ID of the water injection conduit where the water is injected. The enlarged ID is then maintained downstream through the blast hose 20. This prevents residual water from flowing upstream or gravity back flow to where the abrasive is introduced into the blast air stream which would eventually wet and stop the abrasive flow altogether. The difference in ID, whether tapered or stepped, are the features that prevent gravity back flow of water that may accumulate in the injection area.

Figure 5:
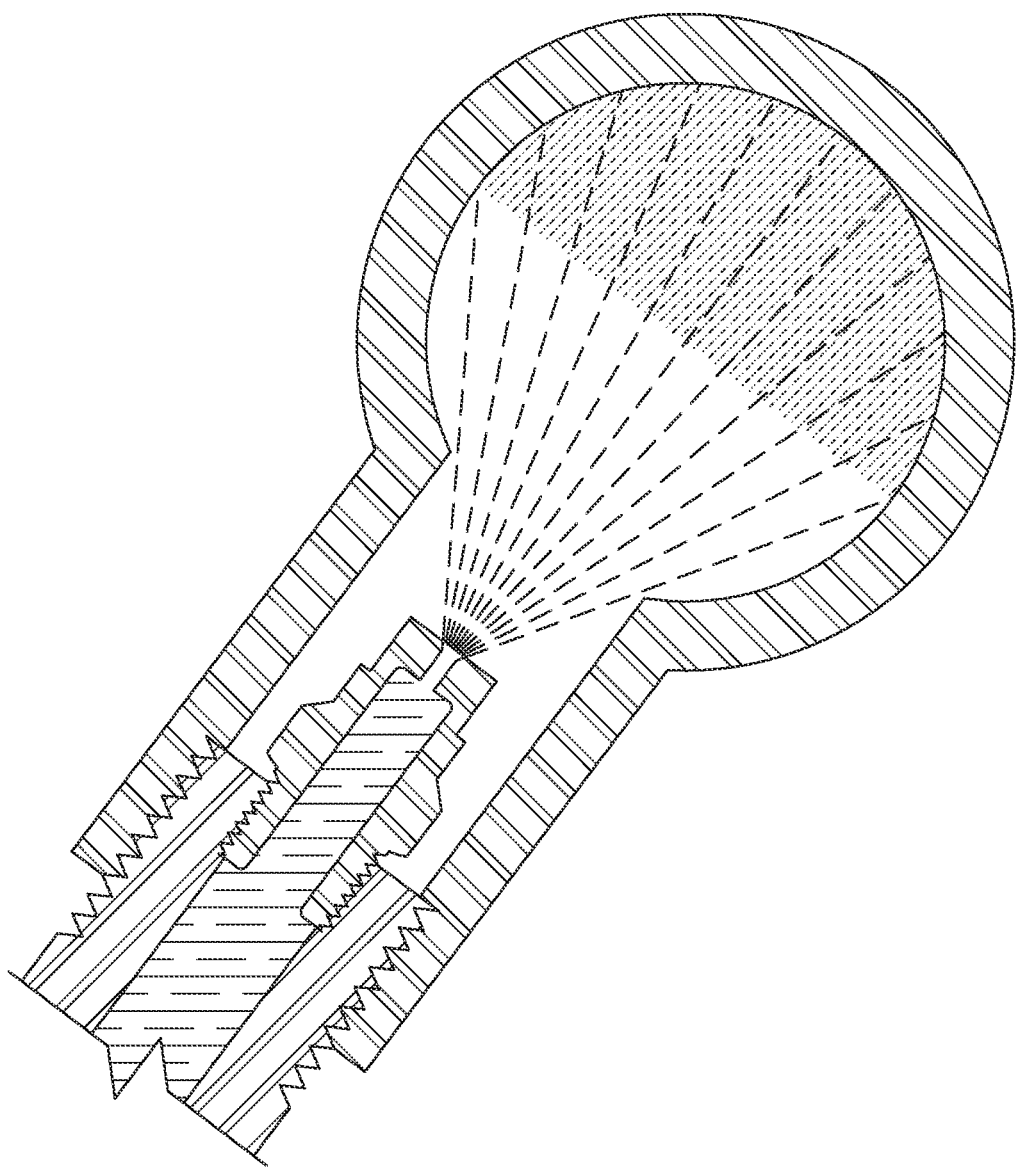
FIG. 5 is an enlarged partial view of FIG. 4 and shows the abrasive flow placement and water injection features of the invention.

The water spray nozzle 18 is placed inside a port or conduit 21 that intersects the water injection conduit at an oblique angle rather directly perpendicular to the abrasive flow. The water spray angle follows general direction of blast air flow for efficiency. A forty-five degree angle has been found to operate at optimum efficiency. However, the specific angle used is a matter of choice depending of operation and application. The angle spray port 21 is smaller in diameter than the water injection conduit 24 in order to use the main air stream flow momentum to keep the abrasive from contacting the spray nozzle. The blast air flow directs the grit and dust away from the spray nozzle, minimizing or even eliminating clogs. As best shown in FIG. 5, the spray nozzle is placed sufficiently within the spray port to further decrease the likelihood of abrasive contact with the water spray nozzle. The radial orientation of the water spray nozzle relative to the abrasive feed orientation allows optimum effectiveness for wetting the abrasive.

Figure 6:
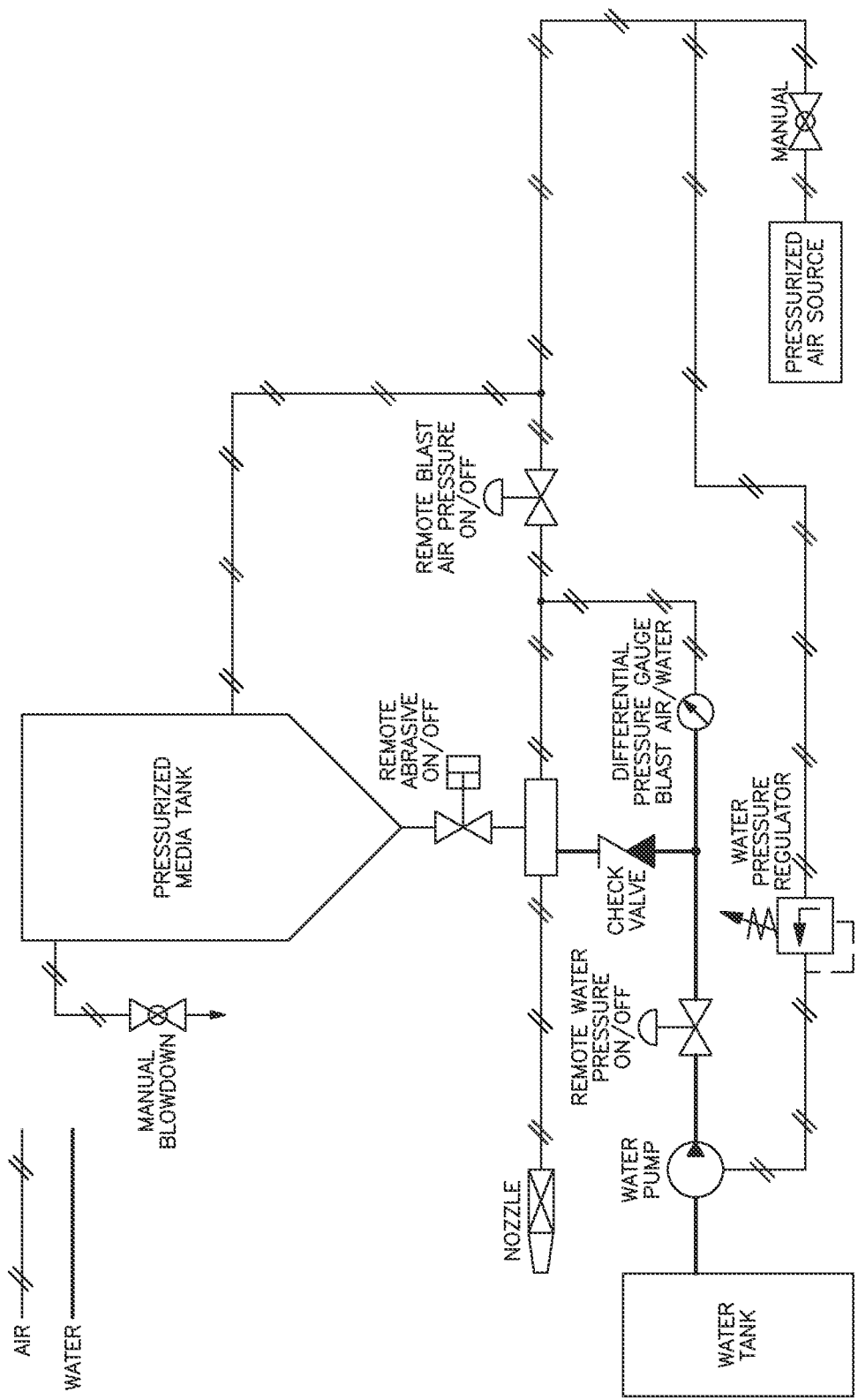
FIG. 6 is a circuit diagram for controlling the flow of abrasive, air and water in the system.
Figure 7:
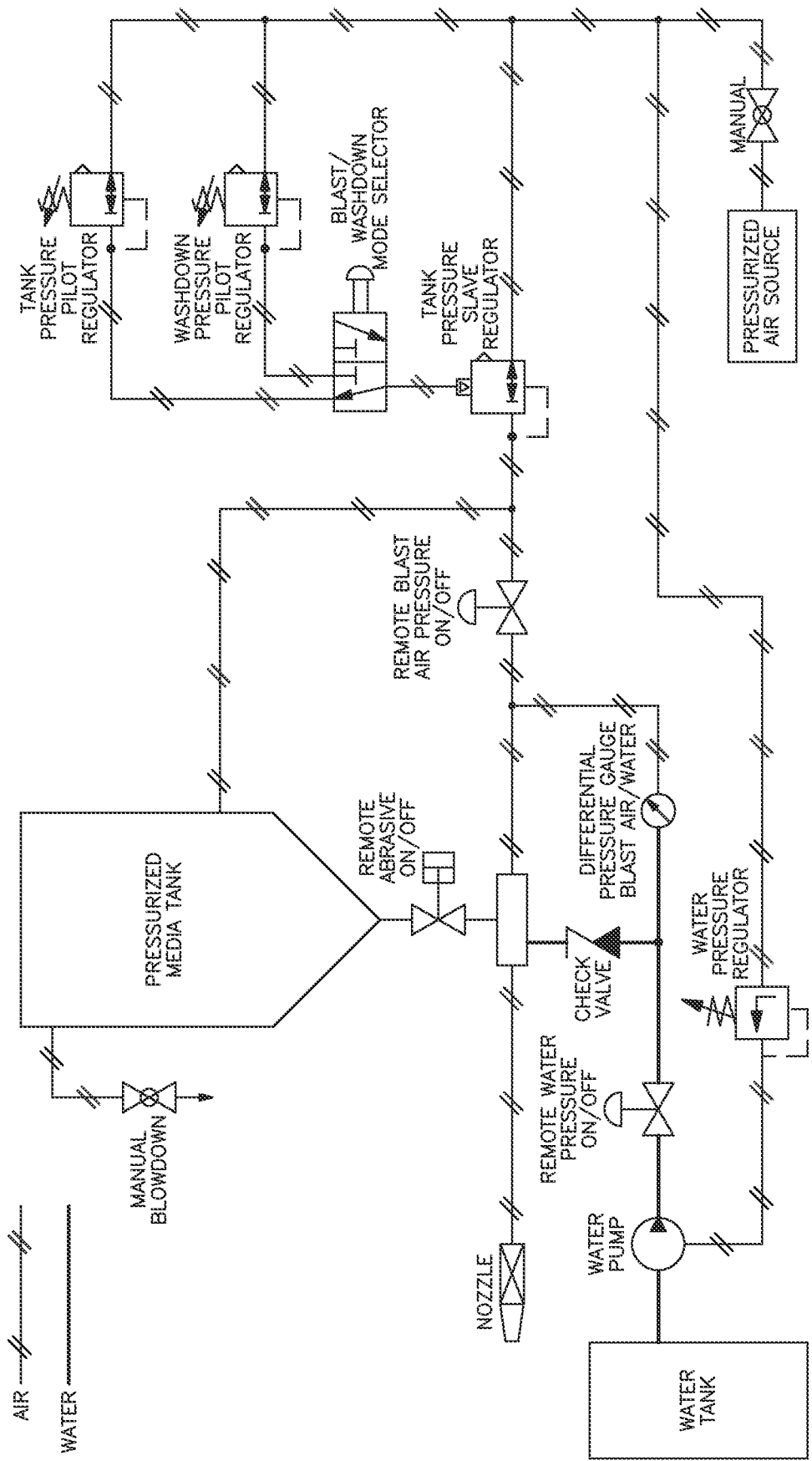
FIG. 7 is similar to FIG. 6 with the addition of a washdown circuit and a blowdown circuit.

As shown in FIGS. 6 and 7, two additional unique features of the invention are the development of a new water injection delivery system and a control system that permit better control of the air/water mix during operation. In the subject invention, the water pressure can be regulated, as well as the air pressure. This assures that the differential pressure between air pressure and water pressure can be accurately monitored and controlled. Because the water spray nozzle is a fixed opening, the operator can adjust either air or water pressure to increase or decrease the differential pressure between the two. This provides consistent and repeatable water flow control.

One advantage of this system is the ability to perform four separate operations using the same delivery and mix system and the same release nozzle. The customary wet blast operation can be performed using the air/media/water mixed controlled to the desired combination and pressure. Where desired, the media flow may be cut off, permitting a media free water rinse. In addition, the water may also be cut off, permitting the use of the pressurized air flow to function as a dryer. Further the system can be used in a standard dry blast mode.

The water injection system is unique and novel in that instead of providing uniform media flow past the injector, the media flow is partially deflected away from the water outlet, permitting the water to flow into and more fully saturate the water injection conduit. This promotes more uniform mixing of the media and water and has the added advantage of creating a space between the water injector nozzle and the dry media, reducing the tendency to clog the nozzle, particularly at low pressure operation when the media can back flow toward the water injector nozzle. Specifically, a media release orifice is provided below the metering valve and above the main air stream for directing the media stream away from the water injector nozzle. This keeps the nozzle from being clogged and provides more clear space in the injector unit for better distribution of the water.

The water spray chamber is for preventing abrasives within the flow stream from contacting the spray nozzle. The tapered or stepped ID feature are for preventing gravity backflow from accumulation of residual water in the spray area or water injection conduit. The taper internal diameter and the step down internal diameter are both placed upstream of the water injection point and downstream of the abrasive feed port. Specifically, the ID of the blast media release conduit where the abrasive is fed is smaller than the ID of the water injection conduit where the water is injected. The enlarged ID is then maintained downstream through the blast hose. This prevents residual water from flowing upstream to where the abrasive is introduced into the blast air stream which would eventually wet and stop the abrasive flow altogether.

A differential pressure gage is positioned between water pressure and blast air pressure to visually indicate, quantify, and control water injection flow rate. The ability to have consistent, adjustable, and repeatable water flow control with a simple operation is a significant advantage over prior art dry blast based systems. In the exemplary embodiment, the differential pressure indicator is positioned to measure the difference between the water pressure and blast air pressure. Since water injection cannot be achieved unless the water pressure is greater than the blast air pressure. Typically, the spray nozzle is a fixed orifice, water flow rate is proportional to how much the water pressure is greater than the blast air pressure. This differential pressure gage reading provides the operator with a visual indication of volume flow rate. In addition, a water pressure regulator is provided for permitting the operator to adjust the water pressure. The pressure differential indicator and the water pressure regulator, in combination, provide the operator with the means to consistently and repeatedly control the water flow rate. Manually variable water flow is important because each operator will adjust the water flow according to the abrasive type, abrasive size, abrasive flow rate, dust content, blast pressure, and surface to be blasted.

An additional feature of the invention is the inclusion of a washdown circuit. After wet blasting, the surface is usually left with residual abrasive. This requires a rinse to wash the abrasive off the surface. The water flow rate for washdown is significantly higher than the water flow rate during blasting which is usually for dust control.

An additional feature may be a blowoff using compressed air to blow dry and ready the blasted surface for painting. This feature basically allows two settings of air pressure. One is for blasting which is generally greater than 80 psig. The washdown and blowoff would be at a much lower air pressure approximately 35 psig. This is achieved by allowing the operator to quickly select either pressure setting. If the water pressure regulator setting is the same, significantly lowering the regulated air pressure will concurrently increase the water flow rate; thereby quickly creating a washdown mode. If the water flow is shutoff, this creates a lower pressure blowoff mode also. The washdown/blowoff circuit consists of two pilot air regulators and a slave regulator. A high-pressure blast pilot regulator and a washdown/blowoff pilot regulator are each ported to the much larger and higher flow slave regulator. A three-way valve is placed between the two pilot regulators and slave regulator to allow the operator to manually select which pilot regulator controls the slave regulator.

While certain features and embodiments have been explained in detail herein, it should be understood that the invention encompasses all modifications and enhancements in accordance with the following claims.

What is claimed is:

1. A wet dry blast system of the type having a source of pressurized air and a source of pressurized water, and thus providing pressurized air flow and pressurized water flow, and an abrasive media source to provide abrasive media for mixing with the pressurized air flow and the pressurized water flow for creating a wet abrasive media mix for wet blasting a work surface, the system further comprising:
    a blast hose configured to convey the wet abrasive media mix;
    a blast nozzle coupled with the blast hose, and configured to release and deliver the wet abrasive media mix to the work surface;
    the source of pressurized air for delivering the pressurized air flow to an abrasive release conduit upstream of a water injection conduit;
    the source of abrasive media configured to introduce abrasive media into the abrasive release conduit;
    a water injection nozzle oriented to inject pressurized water flow in a radial manner into the water injection conduit downstream of the abrasive release conduit; and
    a differential pressure gauge positioned between and in fluid communication with each of the pressurized water flow and the pressurized air flow for monitoring and measuring the water pressure relative to the air pressure in order to provide an indication of a rate of the water flow from the source of pressurized water for use in controlling the water flow in the wet abrasive media mix, whereby the abrasive media is introduced into the pressurized air flow before the pressurized water flow is introduced.

2. The wet dry blast system of claim 1, wherein the wet dry blast system is operably configured for selectively disabling the source of pressurized water such that the mixture of pressurized air and abrasive media is delivered to the blast nozzle in a dry mix.

3. The wet dry blast system of claim 1, wherein the wet dry blast system is operably configured for selectively disabling the source of abrasive media such that the pressurized water and air is delivered to the blast nozzle as pressurized water source for providing a water wash down for the system.

4. The wet dry blast system of claim 1, the dry blast system further comprising a water pressure regulator for permitting adjustment to the water pressure,
    wherein the indication of the pressure differential gauge and the water pressure regulator are operable together in combination to provide control of the water flow rate.

5. The wet dry blast system of claim 1, wherein the differential pressure gauge facilitates control of keeping the water pressure greater than the air pressure;
    wherein the abrasive media is introduced into the abrasive release conduit and into the flow of pressurized air downstream of the source of pressurized air and upstream of the source of pressurized water,
    wherein the blast hose is coupled with the water injection conduit, and
    wherein a media release orifice is configured for directing the flow of abrasive media along a lower portion of the media release flow conduit.

6. The wet dry blast system of claim 5, wherein the blast hose has a first blast hose end coupled with the water injection conduit and a second blast hose end coupled with the blast nozzle, wherein there is a media release orifice configured to introduce the abrasive media into the abrasive release conduit and into the pressurized air flow from the pressurized air source, and wherein the pressurized water source introduces water into the water injection conduit downstream of the media release orifice for generating the wet abrasive media mix for release into the blast hose, and eventually out of the blast nozzle.

7. The wet try blast system of claim 6, wherein a size of the media release orifice is determined by a restrictor.

8. The wet dry blast system of claim 7, wherein an interior diameter of the water injection conduit at the point of water injection is larger than another interior diameter of the release conduit at the point where the media is introduced from the release orifice.

9. The wet dry blast system of claim 1, the system configured to provide four separate modes of operation, the system further comprising:
    a. the first mode operable to form and to provide the wet abrasive media mixture for wet blasting;
    b. a second mode wherein only the source of abrasive media and the source of pressurized air are activated to provide a dry abrasive delivery for dry blasting;
    c. a third mode wherein only the source of pressurized air is activated to provide an air-only drying system; and
    d. a fourth mode wherein only the source of pressurized water is activated to provide a water-only rinse.

10. The wet dry blast system of claim 9, wherein the first mode and the second mode are operable with at least 80 psig air pressure, and wherein the third mode and the fourth mode are operable at less than 35 psig air pressure.

11. The wet dry blast system of claim 10, wherein the blast hose has a first blast hose end coupled with the water injection conduit and a second blast hose end coupled with the blast nozzle, wherein there is a media release orifice configured to introduce the abrasive media into the abrasive release conduit and into the pressurized air flow from the pressurized air source, and wherein the pressurized water source introduces water into the water injection conduit downstream of the media release orifice for generating the wet abrasive media mix for release into the blast hose, and eventually out of the blast nozzle.

12. The wet dry blast system of claim 11, wherein a size of the media release orifice is determined by a restrictor.

13. The wet dry blast system of claim 1, wherein a water injection radial orientation is within plus/minus 70 degrees of a reference vertical.

14. The wet dry blast system of claim 1, wherein a water injection radial orientation is within plus/minus 70 degrees of a reference vertical.

15. A wet dry blast system, the system further comprising:
a source of pressurized air for providing a pressurized air flow;
a source of pressurized water for providing a pressurized water flow;
an abrasive media source to provide an abrasive media;
an abrasive release conduit for receiving the abrasive media;
a water injection conduit coupled with the abrasive release conduit, and positioned downstream therefrom, whereby the pressurized air flow, the pressurized water, and the abrasive media form a wet abrasive media mix;
a water injection nozzle oriented to inject the pressurized water flow in a radial manner into the water injection conduit downstream of the abrasive release conduit;
a blast hose configured to convey the wet abrasive media mix received from the water injection conduit;
a blast nozzle coupled with the blast hose, and configured to release and deliver the wet abrasive media mix from the blast hose to a work surface; and
a differential pressure gauge positioned between and in fluid communication with each of the pressurized water flow and the pressurized air flow for monitoring and measuring the water pressure relative to the air pressure in order to provide an indication of a rate of the water flow from the source of pressurized water for use in controlling the water flow in the wet abrasive media mix, whereby the abrasive media is introduced into the pressurized air flow before the pressurized water flow is introduced.

16. The wet dry blast system of claim 15, wherein the differential pressure gauge facilitates control of keeping the water pressure greater than the air pressure, and wherein a media release orifice is configured for directing the flow of abrasive media along a lower portion of the media release flow conduit.

17. The wet try blast system of claim 15, wherein a size of the media release orifice is determined by a restrictor.

18. The wet dry blast system of claim 17, wherein an interior diameter of the water injection conduit at the point of water injection is larger than another interior diameter of the release conduit at the point where the media is introduced from the release orifice.

19. A wet dry blast system, the system further comprising:
a source of pressurized air for providing a pressurized air flow;
a source of pressurized water for providing a pressurized water flow;
an abrasive media source to provide an abrasive media;
an abrasive release conduit for receiving the abrasive media;
a water injection conduit coupled with the abrasive release conduit, and positioned downstream therefrom, whereby the pressurized air flow, the pressurized water, and the abrasive media form a wet abrasive media mix;
a water injection nozzle oriented to inject the pressurized water flow in a radial manner into the water injection conduit downstream of the abrasive release conduit;
a blast hose configured to convey the wet abrasive media mix received from the water injection conduit;
a blast nozzle coupled with the blast hose, and configured to release and deliver the wet abrasive media mix from the blast hose to a work surface; and
a differential pressure gauge positioned between and in fluid communication with each of the pressurized water flow and the pressurized air flow for monitoring and measuring the water pressure relative to the air pressure in order to provide an indication of a rate of the water flow from the source of pressurized water for use in controlling the water flow in the wet abrasive media mix, wherein the differential pressure gauge facilitates control of keeping the water pressure greater than the air pressure, and wherein a media release orifice is configured for directing and tightening the flow of abrasive media along a lower portion of the media release flow conduit.

\* \* \* \* \*